US012632226B2

(12) United States Patent
Rutter et al.

(10) Patent No.: US 12,632,226 B2
(45) Date of Patent: May 19, 2026

(54) MODEL-BASED VISUAL REPRESENTATION OF APPARATUS OPERATIONAL STATUS

(71) Applicant: Disney Enterprises, Inc., Burbank, CA (US)

(72) Inventors: Carlton M. Rutter, Glendale, CA (US); Kristin Athans, Coto de Caza, CA (US); Cynthia A. Marinaro, Glendale, CA (US); Pedro L. Lima, Covina, CA (US)

(73) Assignee: Disney Enterprises, Inc., Burbank, CA (US)

( * ) Notice: Subject to any disclaimer, the term of this patent is extended or adjusted under 35 U.S.C. 154(b) by 282 days.

(21) Appl. No.: 18/603,674

(22) Filed: Mar. 13, 2024

(65) Prior Publication Data

US 2025/0291556 A1 Sep. 18, 2025

(51) Int. Cl.
| | |
|---|---|
| *G06F 9/44* | (2018.01) |
| *G06F 8/34* | (2018.01) |
| *G06F 8/35* | (2018.01) |
| *G06F 9/45* | (2006.01) |
| *G06F 9/54* | (2006.01) |
| *G06F 17/00* | (2019.01) |
| *G06F 17/30* | (2006.01) |
| *H04L 29/06* | (2006.01) |

(52) U.S. Cl.
CPC . *G06F 8/34* (2013.01); *G06F 8/35* (2013.01)

(58) Field of Classification Search
CPC ... G06F 8/34; G06F 8/35; G06F 9/542; G06F 3/04817; G06F 16/904; G06F 3/0484; G06F 16/25; G06F 21/629; G06F 16/248; G06F 16/2477; G06F 40/169; G06Q 10/0639; G06Q 30/016; H04L 43/026; H04L 63/1425
See application file for complete search history.

(56) References Cited

U.S. PATENT DOCUMENTS

| | | | | |
|---|---|---|---|---|
| 9,742,625 | B2 * | 8/2017 | Delinocci | H04L 41/0654 |
| 9,846,608 | B2 * | 12/2017 | Nandakumar | G06F 11/0793 |

* cited by examiner

*Primary Examiner* — Thuy Dao
(74) *Attorney, Agent, or Firm* — Farjami & Farjami LLP

(57) ABSTRACT

A system includes a hardware processor and a memory storing software code. The hardware processor is configured to execute the software code to receive operational data including multiple timestamps each corresponding to an operating state of an apparatus, receive, from a system user, a query identifying at least one of an apparatus event or one of the timestamps, and obtain, based on the operational data and in response to the query, a software design model of the apparatus. The hardware processor is further configured to execute the software code to identify, using the operational data and the software design model, an operational status of the apparatus at the identified at least one of the apparatus event or timestamp, generate, based on the software design model, a visual representation of that operational status, and provide an output data including the visual representation to the system user.

20 Claims, 5 Drawing Sheets

460

Accessing, further in response to the query, control software code of the apparatus ⌐∖ 467

Mapping the operational status of the apparatus at the at least one of the apparatus event or the timestamp Identified by the query to one or more lines of the control software code ⌐∖ 468

Figure 4A:
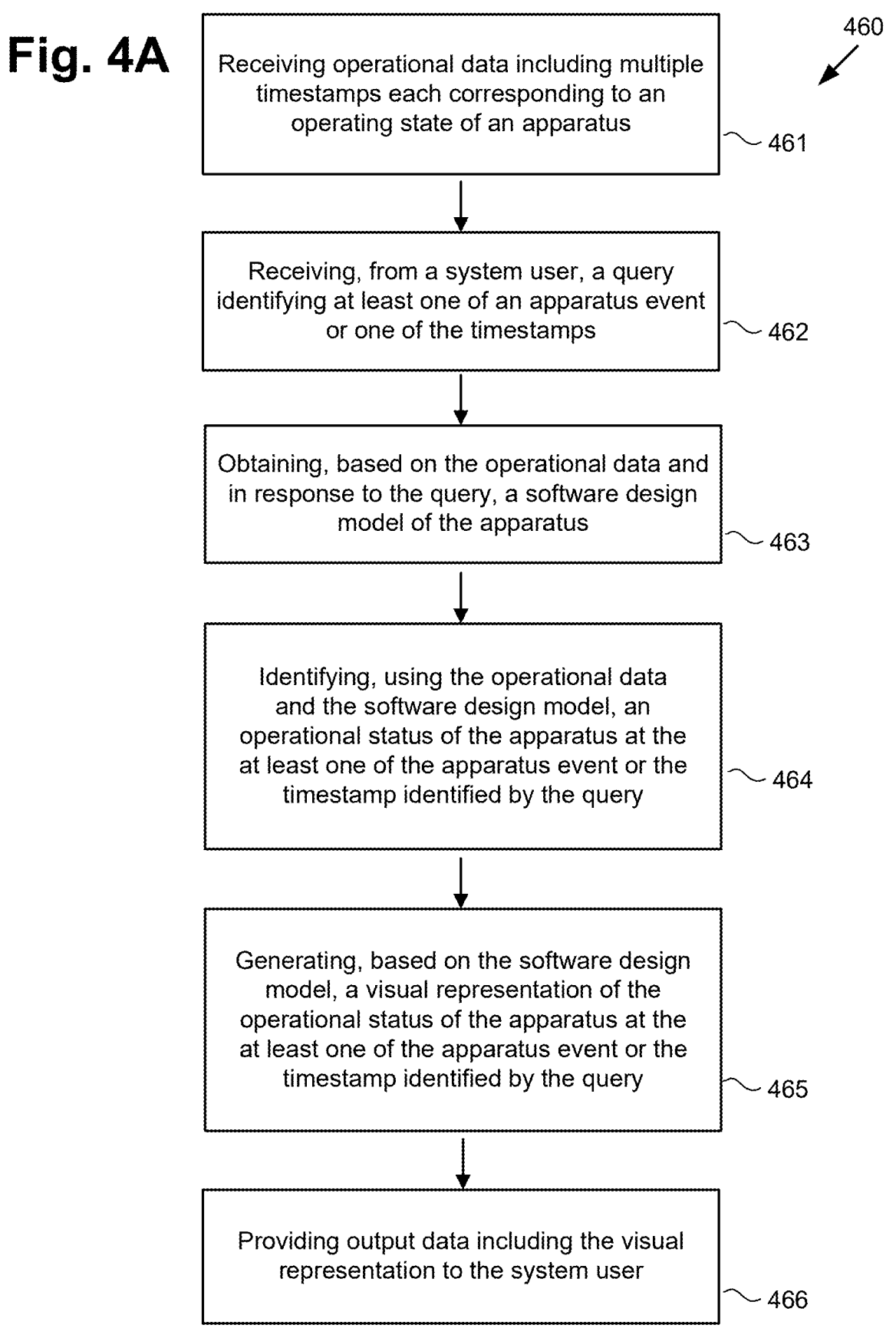

Receiving operational data including multiple timestamps each corresponding to an operating state of an apparatus ~461

Receiving, from a system user, a query identifying at least one of an apparatus event or one of the timestamps ~462

Obtaining, based on the operational data and in response to the query, a software design model of the apparatus ~463

Identifying, using the operational data and the software design model, an operational status of the apparatus at the at least one of the apparatus event or the timestamp identified by the query ~464

Generating, based on the software design model, a visual representation of the operational status of the apparatus at the at least one of the apparatus event or the timestamp identified by the query ~465

Providing output data including the visual representation to the system user ~466

460

Accessing, further in response to the query, control software code of the apparatus

467

Mapping the operational status of the apparatus at the at least one of the apparatus event or the timestamp Identified by the query to one or more lines of the control software code

468

MODEL-BASED VISUAL REPRESENTATION OF APPARATUS OPERATIONAL STATUS

BACKGROUND

Many industrial apparatuses are interconnected systems-of-systems having software designs that are increasingly complicated and distributed. Model-based design and design behavioral constructs are often used to capture the complexity of these software designs. The larger a system-of-systems based apparatus is, the more difficult it becomes to traverse, understand and navigate the software design of that apparatus, because, for example, hundreds of pages of design artifacts may exist. Deciphering nested internal states of an operating apparatus against various state machine designs or other design behavioral constructs is very time-consuming, thereby making debugging and troubleshooting undesirably costly and inefficient. Consequently, there is a need in the art for a solution enabling system developers and engineers to easily navigate complex apparatus-based software design models in order to identify the operational status of an apparatus at a particular point in time.

BRIEF DESCRIPTION OF THE DRAWINGS

FIG. 4A shows a flowchart presenting an exemplary method for providing design model-based visual representation of apparatus operational status, according to one implementation.

DETAILED DESCRIPTION

Figure 1:
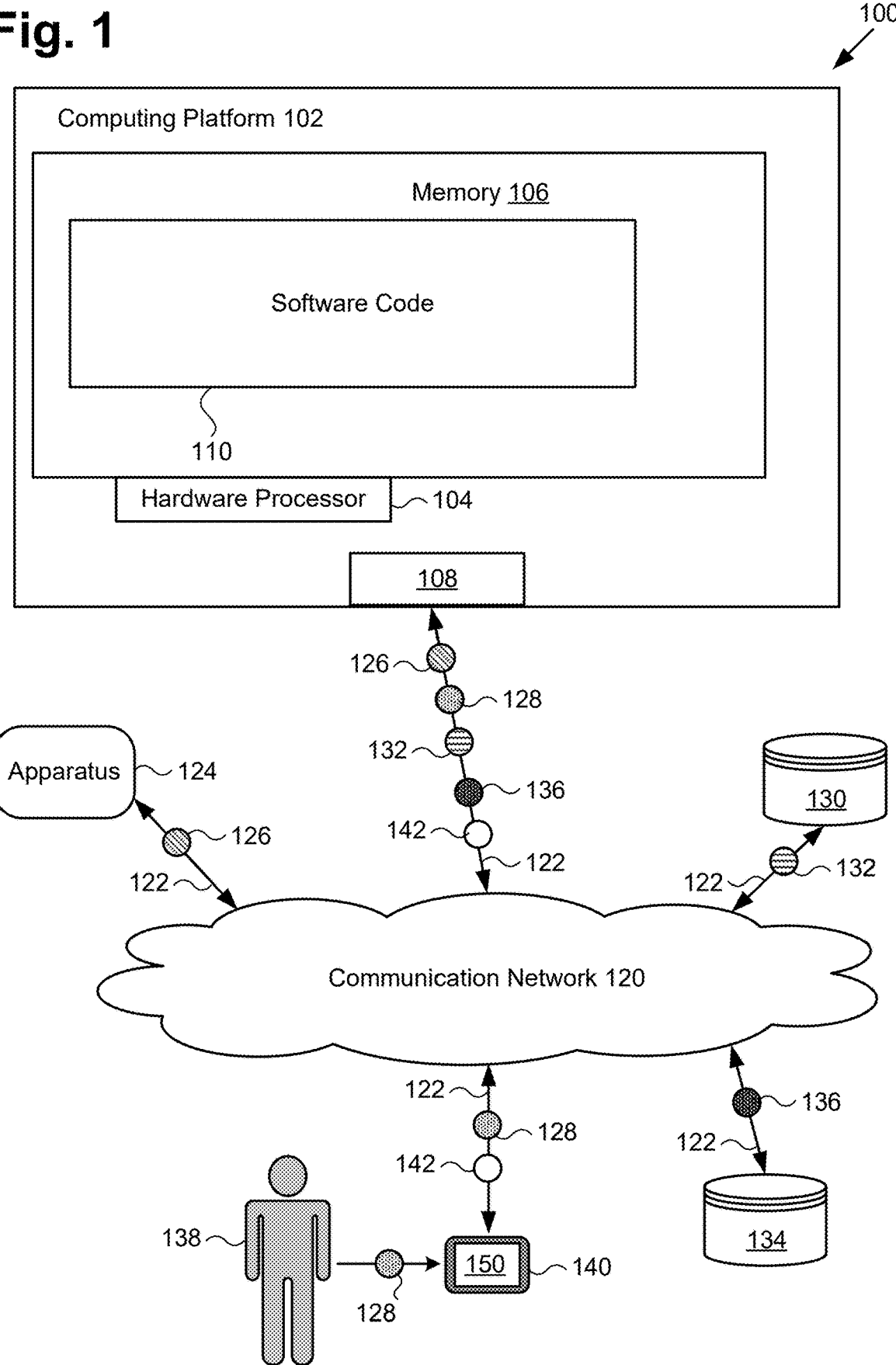
FIG. 1 shows an exemplary system for providing design model-based visual representation of apparatus operational status, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As stated above, many industrial apparatuses are interconnected systems-of-systems having software designs that are increasingly complicated and distributed. Model-based design and design behavioral constructs are often used to capture the complexity of these software designs. The larger a system-of-systems based apparatus is, the more difficult it becomes to traverse, understand and navigate the software design of that apparatus, because, for example, hundreds of pages of design artifacts may exist. Deciphering nested internal states of an operating apparatus against various state machine designs or other design behavioral constructs is very time-consuming, thereby making debugging and troubleshooting undesirably costly and inefficient.

The present application discloses systems and methods for providing design model-based visual representation of apparatus operational status that address and overcome the drawbacks and deficiencies in the conventional art by enabling system developers and engineers to easily navigate complex apparatus-based software design models. The solution disclosed in the present application serves as a translator between operational data generated by an apparatus and the operational status of the apparatus at the time the operational data is generated, and thus advantageously provides an automatic way for engineers to visualize relevant portions of the software design model of the apparatus. The present diagnostic solution leads to increased accuracy during analysis of apparatus performance and reduced time and effort when troubleshooting because the solution aligns the operational data with the software design model. According to conventional approaches, by contrast, an engineer would look at recorded data and attempt to manually follow the data through the software design model of the apparatus, which may include thousands of pages of documentation.

Moreover, in some implementations, the present diagnostic solution enables an engineer or other troubleshooter to map the operational status of the apparatus when operational data is generated, to specific lines of the control software code for the apparatus. In addition, it is noted that in some implementations, the present solution for providing design model-based visual representation of apparatus operational status may advantageously be implemented as automated systems and method. As used in the present application, the terms "automation," "automated" and "automating" refer to systems and processes that do not require the participation of a human system administrator. Thus, the methods described in the present application may be performed under the control of hardware processing components of the disclosed systems.

FIG. 1 shows an exemplary system for providing design model-based visual representation of apparatus operational status, according to one implementation. As shown in FIG. 1, system 100 includes computing platform 102 having hardware processor 104, memory 106 implemented as a non-transitory storage medium, and transceiver 108. According to the present exemplary implementation, memory 106 stores software code 110.

As further shown in FIG. 1, system 100 is implemented within a use environment including apparatus 124, software design model database 130, control software code database 134, portable device 140 including display 150, and communication network 120 providing network communication links 122 communicatively coupling system 100 with apparatus 124, software design model database 130, control software code database 134, and portable device 140. Also shown in FIG. 1 is system user 138 utilizing portable device 140 to interact with system 100, as well as operational data 126 of apparatus 124, software design model 132 of apparatus 124, control software code 136 of apparatus 124, query 128 from system user 138 and output data 142 generated by system 100.

It is noted that system user 138 may be a developer of apparatus 124 or an engineer or programmer tasked with evaluating the operational performance of apparatus 124. It is further noted that, in some use cases, operational data 126 may describe a past operation of apparatus 124, and may be utilized to perform a forensic analysis of a historical performance of apparatus 124. However, in other use cases, operational data 126 may be received dynamically while apparatus 124 is in operation. In some implementations, as shown in FIG. 1, operational data 126 may be received from apparatus 124 via communication network 120 and network communication links 122. It is also noted that in various implementations, apparatus 124 may be or include a traffic light, a baggage claim carousel, an automated warehouse, a theme park attraction, or one or more vehicle assembly line machines, for example.

Referring to system 100, memory 106 may take the form of any computer-readable non-transitory storage medium. The expression "computer-readable non-transitory storage medium," as defined in the present application, refers to any medium, excluding a carrier wave or other transitory signal that provides instructions to hardware processor 104 of computing platform 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs, RAM, programmable read-only memory (PROM), erasable PROM (EPROM), and FLASH memory.

Moreover, in some implementations, system 100 may utilize a decentralized secure digital ledger in addition to memory 106. Examples of such decentralized secure digital ledgers may include a blockchain, hashgraph, directed acyclic graph (DAG), and Holochain® ledger, to name a few. In use cases in which the decentralized secure digital ledger is a blockchain ledger, it may be advantageous or desirable for the decentralized secure digital ledger to utilize a consensus mechanism having a proof-of-stake (POS) protocol, rather than the more energy intensive proof-of-work (PoW) protocol.

It is further noted that although FIG. 1 depicts software code 110 as being located in its entirety in a single instance of memory 106, that representation is merely provided as an aid to conceptual clarity. More generally, system 100 may include one or more computing platforms 102, such as computer servers for example, which may be co-located, or may form an interactively linked but distributed system, such as a cloud based system, for instance. As a result, hardware processor 104 and memory 106 may correspond to distributed processor and memory resources within system 100. Furthermore, although FIG. 1 depicts software design model database 130 and control software code database 134 as remote resources accessible by system 100 via communication network 120 and network communication links 122, in some implementations, one or both of software design model database 130 and control software code database 134 may be a component or components of system 100 and may be stored within memory 106.

Hardware processor 104 may include multiple hardware processing units, such as one or more central processing units, one or more graphics processing units, and one or more tensor processing units, one or more field-programmable gate arrays (FPGAs), custom hardware for machine-learning training or inferencing, and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as software code 110, from memory 106, while a GPU may be implemented to reduce the processing overhead of the CPU by performing computationally intensive graphics or other processing tasks. A TPU is an application-specific integrated circuit (ASIC) configured specifically for artificial intelligence (AI) applications such as machine learning modeling.

Transceiver 108 of system 100 may be implemented as a wireless communication unit configured for use with one or more of a variety of wireless communication protocols. For example, transceiver 108 may include a fourth generation (4G) wireless transceiver and/or a 5G wireless transceiver. In addition, or alternatively, transceiver 108 may be configured for communications using one or more of Wireless Fidelity (Wi-Fi®), Worldwide Interoperability for Microwave Access (WiMAX®), Bluetooth®, Bluetooth® low energy (BLE), ZigBee®, radio-frequency identification (RFID), near-field communication (NFC), and 60 GHz wireless communications methods.

In some implementations, computing platform 102 may correspond to one or more web servers, accessible over a packet-switched network such as the Internet, for example. Alternatively, computing platform 102 may correspond to one or more computer servers supporting a private wide area network (WAN), local area network (LAN), or included in another type of limited distribution or private network. In addition, or alternatively, in some implementations, system 100 may utilize a local area broadcast method, such as User Datagram Protocol (UDP) or Bluetooth, for instance. Furthermore, in some implementations, system 100 may be implemented virtually, such as in a data center. For example, in some implementations, system 100 may be implemented in software, or as virtual machines. Moreover, in some implementations, communication network 120 may be a high-speed network suitable for high performance computing (HPC), for example a 10 GigE network or an Infiniband network.

Portable device 140 may take the form of a smartphone, or any other suitable portable computing system that implements data processing capabilities sufficient to provide a user interface, and implement the functionality attributed to portable device 140 herein. For example, in other implementations, portable device 140 may take the form of a tablet computer, laptop computer, or an augmented reality (AR) or virtual reality (VR) device, for example, providing display 150. Display 150 may take the form of a liquid crystal display (LCD), a light-emitting diode (LED) display, an organic light-emitting diode (OLED) display, a quantum dot (QD) display, or any other suitable display screen that performs a physical transformation of signals to light.

Figure 2:
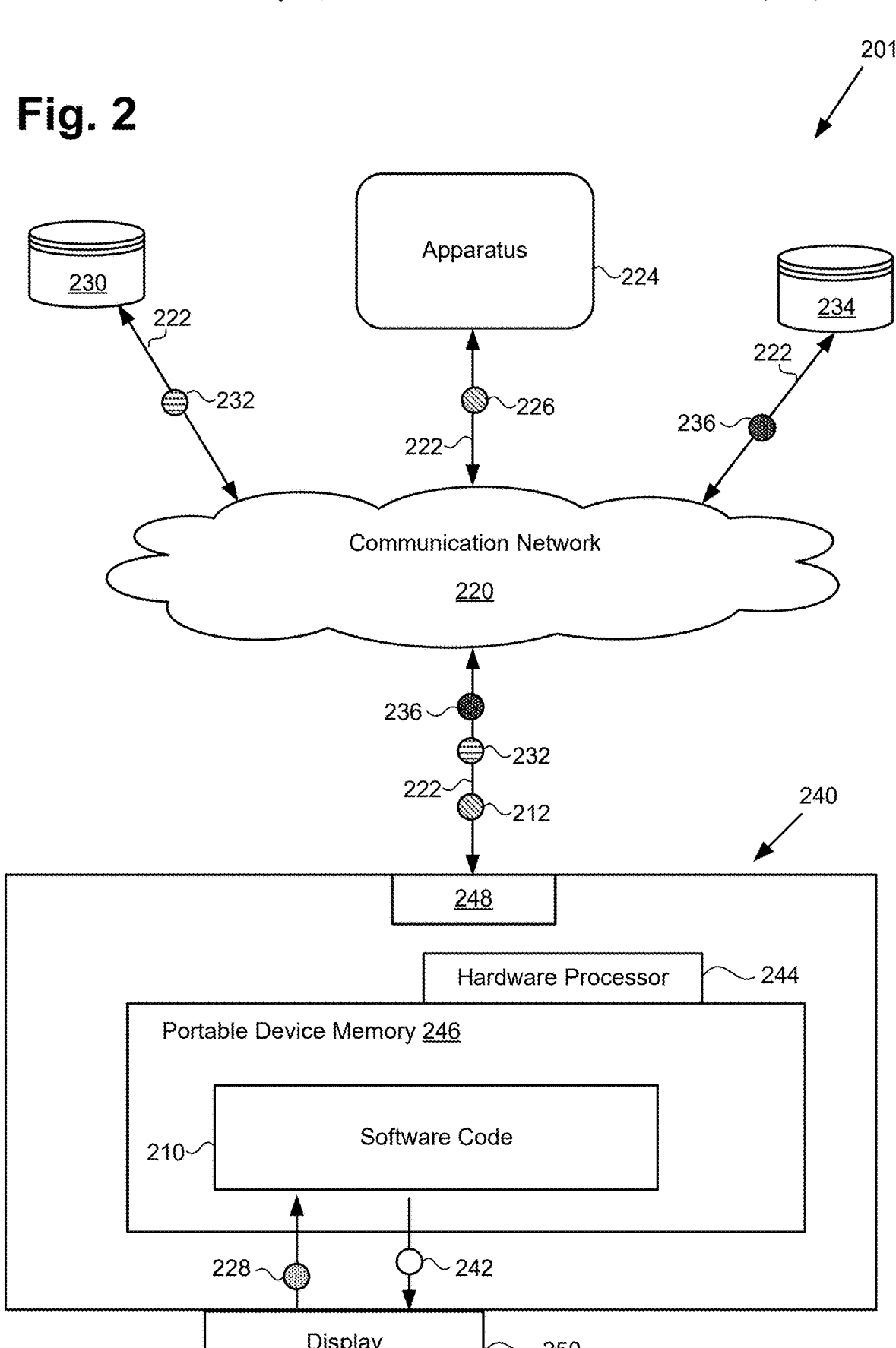
FIG. 2 shows a more detailed diagram of the portable device shown in FIG. 1, according to one implementation.

FIG. 2 shows a more detailed diagram of portable device 240, according to one implementation. As shown in FIG. 2, portable device 240 includes hardware processor 244, transceiver 248, display 250 and portable device memory 246 implemented as a computer-readable non-transitory storage medium storing software code 210.

As further shown in FIG. 2, portable device 240 is utilized in use environment 201 including apparatus 224, software design model database 230, control software code database 234, and communication network 220 providing network communication links 222 communicatively coupling portable device 240 with apparatus 224, software design model database 230 and control software code database 234. Also shown in FIG. 1 are operational data 226 of apparatus 224, software design model 232 of apparatus 224, control software code 236 of apparatus 224, query 228 and output data 242 generated by portable device 240.

Apparatus 224, software design model database 230, control software code database 234, and communication network 220 providing network communication links 222 correspond respectively in general to apparatus 124, software design model database 130, control software code database 134, and communication network 120 providing network communication links 122, in FIG. 1. Consequently, apparatus 224, software design model database 230, control software code database 234, and communication network 220 providing network communication links 222 may share any of the characteristics attributed to respective apparatus 124, software design model database 130, control software code database 134, and communication network 120 providing network communication links 122, and vice versa. That is to say, in various implementations, like apparatus 124, apparatus 224 may be or include a traffic light, a baggage claim carousel, an automated warehouse, a theme park attraction, or one or more vehicle assembly line machines, for example.

In addition, operational data 226, software design model 232, control software code 236, query 228 and output data 242, in FIG. 2, correspond respectively in general to operational data 126, software design model 132, control software code 136, query 128 and output data 142, in FIG. 1. As a result, operational data 226, software design model 232, control software code 236, query 228 and output data 242 may share any of the characteristics attributed to respective operational data 126, software design model 132, control software code 136, query 128 and output data 142 by the present disclosure, and vice versa.

Portable device 240 and display 250 correspond respectively in general to portable device 140 and display 150, in FIG. 1. Thus, portable device 240 and display 250 may share any of the characteristics attributed to respective portable device 140 and display 150 by the present disclosure, and vice versa. For example, like portable device 140, portable device 240 may take the form of a smartphone, tablet computer, laptop computer, or an AR or VR device, for example, providing display 250. In addition, like display 150, display 250 may take the form of an LCD, LED display, OLED display, or QD display. Moreover, although not shown in FIG. 1, portable device 140 may include features corresponding respectively to hardware processor 244, transceiver 248 and portable device memory 246 storing software code 210.

Transceiver 248 may be implemented as a wireless communication unit configured for use with one or more of a variety of wireless communication protocols. For example, transceiver 248 may include a 4G wireless transceiver and/or a 5G wireless transceiver. In addition, or alternatively, transceiver 248 may be configured for communications using one or more of Wi-Fi®, WiMAX®, Bluetooth®, BLE, ZigBee®, RFID, NFC, and 60 GHz wireless communications methods.

Hardware processor 244 of portable device 240 may include multiple hardware processing units, such as one or more CPUs, one or more GPUs, one or more TPUs, and one or more FPGAs, as those features are defined above.

Software code 210 corresponds in general to software code 110, in FIG. 1, and can perform all of the operations attributed to software code 110 by the present disclosure. In other words, in implementations in which hardware processor 244 of portable device 240 executes software code 210 stored locally in portable device memory 246, portable device 240 may perform any of the actions attributed to system 100 by the present disclosure. Thus, in some implementations, software code 210 executed by hardware processor 244 of portable device 240 may receive operational data 226 and query 228, may obtain software design model 232, may access control software code 236, and may provide output data 242 including a visual representation of the operational status of apparatus 224 at a particular time. In other words, in some implementations, system 100 may be embodied in portable device 140/240.

Figure 3:
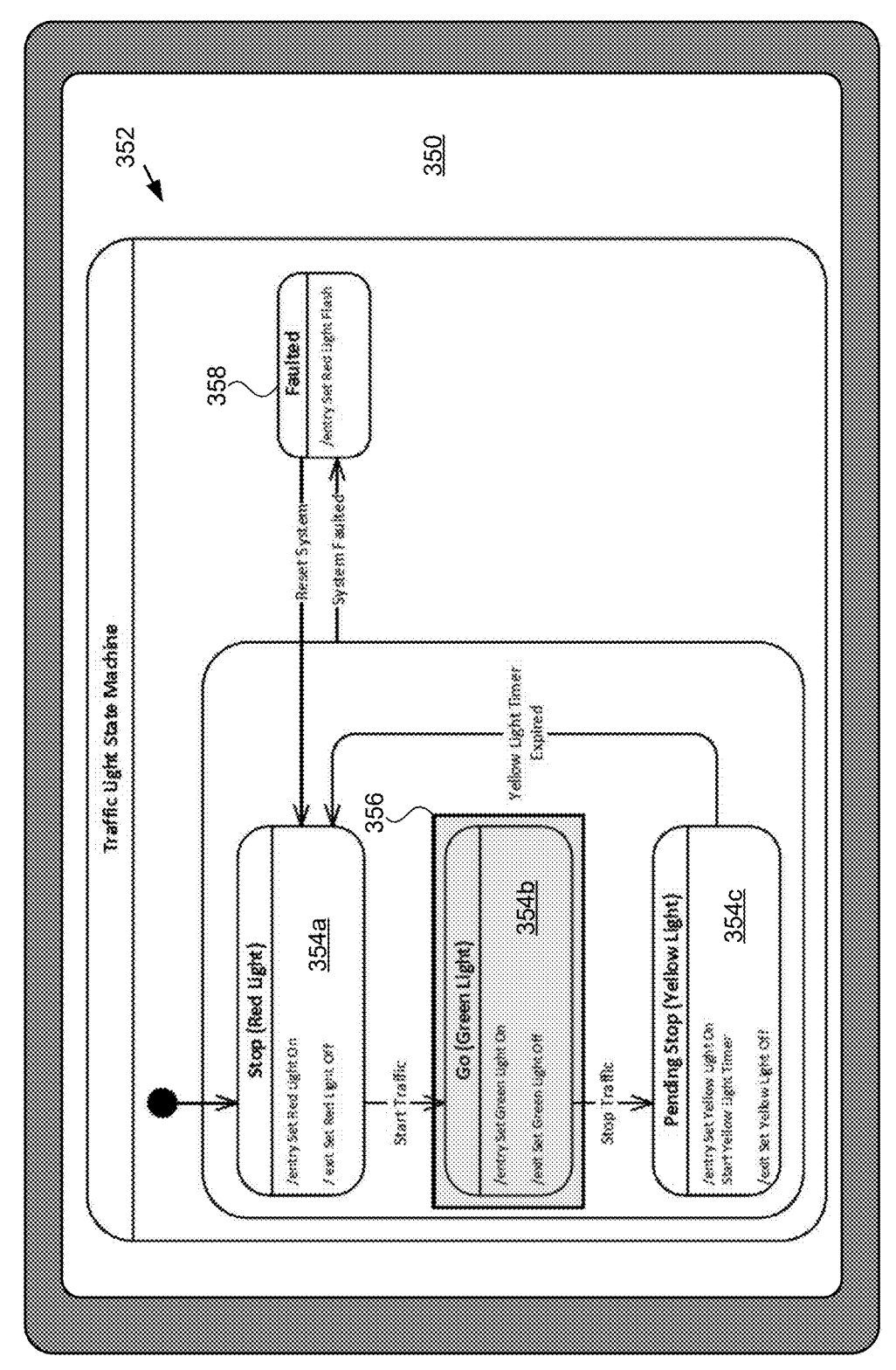
FIG. 3 shows an exemplary design model-based visual representation of apparatus operational status rendered on a display, according to one implementation.

Moving to FIG. 3, FIG. 3 shows exemplary design model-based visual representation 352 of a traffic light state machine showing apparatus operational status 354*b* rendered on display 350 of portable device 340, according to one implementation. It is noted that portable device 340 and display 350 correspond respectively in general to portable device 140/240 and display 150/250 in FIGS. 1 and 2. Consequently, portable device 340 and display 350 may share any of the characteristics attributed to respective portable device 140/240 and display 150/250 by the present disclosure, and vice versa.

By way of example, and referring to FIG. 3 in combination with FIGS. 1 and 2, according to the exemplary implementation shown in FIG. 3, a relevant portion of software design model 132/232 of apparatus 124/224 at one or more of an apparatus event or a timestamp identified by query 128/228 is rendered on display 150/250/350 of portable device 140/240/340 as visual representation 352. As shown by FIG. 3, such a relevant portion of software design model 132/232 of apparatus 124/224 may include operational status 354*b* of apparatus 124/224 at the one or more of the apparatus event or the timestamp identified by query 128/228, as emphasized in visual representation 352 by highlight 356. In addition, in some implementations, the relevant portion of software design model 132/232 of apparatus 124/224 rendered on display 150/250/350 as visual representation 352 may also include prior operational status 354*a* of apparatus 124/224, i.e., the operational status of apparatus 124/224 prior to its transition to operational status 354*b*, as well as subsequent operational status 354*c* to which apparatus 124/224 may transition from operational status 354*b*. Also shown in visual representation 352 is possible fault state 358 of apparatus 124/224 in the relevant portion of software design model 132/232 rendered on display 150/250/350.

Figure 4B:
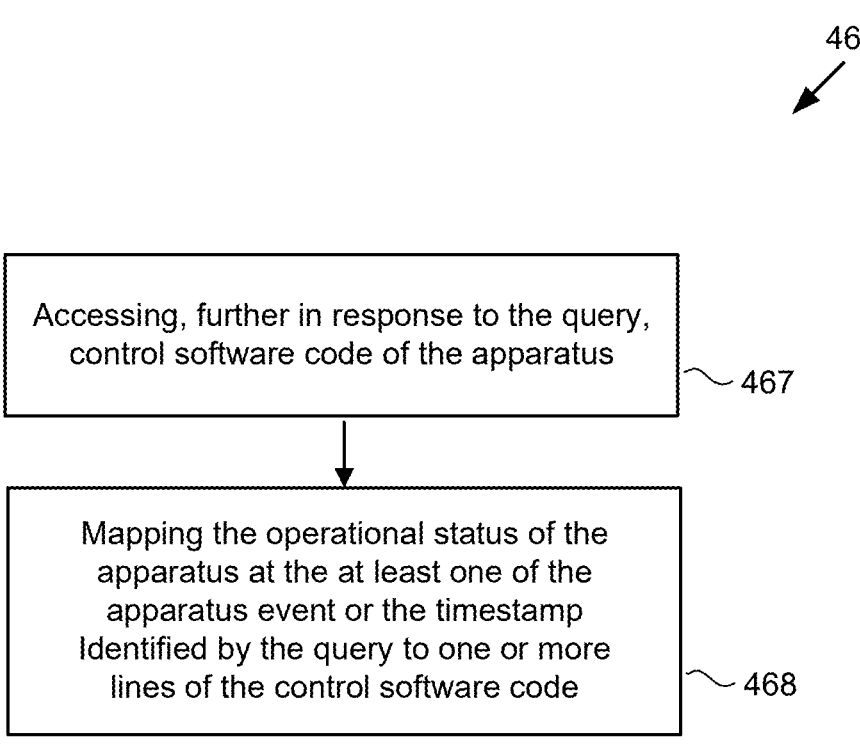
FIG. 4B shows additional actions for extending the method outlined in FIG. 4A, according to one implementation.

The functionality of system 100 and portable device 140/240/340 including software code 110/210, shown variously in FIGS. 1, 2 and 3, will be further described by reference to FIGS. 4A and 4B. FIG. 4A shows flowchart 460 presenting an exemplary method for providing design model-based visual representation of apparatus operational status, according to one implementation, while FIG. 4B shows additional actions for extending the method outlined in FIG. 4A, according to one implementation. With respect to the method outlined in FIGS. 4A and 4B, it is noted that certain details and features have been left out of flowchart 460 in order not to obscure the discussion of the inventive features in the present application.

Referring to FIG. 4A, with further reference to FIGS. 1 and 2, flowchart 460 includes receiving operational data 126/226 including multiple timestamps each corresponding to an operating state of apparatus 124/224 (action 461). As noted above, in various implementations apparatus 124/224 may be or include a traffic light, a baggage claim carousel, an automated warehouse, a theme park attraction, or one or more vehicle assembly line machines, for example.

As noted above by reference to operational data 126, in FIG. 1, in some use cases, operational data 126/226 may describe a past operation of apparatus 124/224, and may be utilized to perform a forensic analysis of a historical performance of apparatus 124/224. However, in other use cases, operational data 126/226 may be received dynamically while apparatus 124/224 is in operation. In some implementations, as shown in FIG. 1, operational data 126 may be received from apparatus 124 via communication network 120 and network communication links 122, in action 461, by software code 110, executed by hardware processor 104 of system 100. In other implementations, as shown by FIG. 2, operational data 226 may be received from apparatus 224 via communication network 220 and network communication links 222, in action 461, by software code 210, executed by hardware processor 244 of portable device 240.

Continuing to refer to FIG. 4A in combination with FIGS. 1 and 2, flowchart 460 further includes receiving, from system user 138, query 128/228 identifying at least one of an apparatus event or one of the timestamps included in operational data 126/226 (action 462). It is noted that, as defined for the purposes of the present application, the expression "apparatus event" refers to any anomalous operating condition of apparatus 124/224. Examples of apparatus events may include a fault condition, power surge, power dip, or any deviations of the operating parameters of apparatus 124/224 from their specified ranges.

As noted above, system user 138 may be a developer of apparatus 124/224 or an engineer or programmer tasked with evaluating the operational performance of apparatus 124/224. As further noted above, although in some use cases operational data 126/226 may describe a past operation of apparatus 124/224, and may be utilized to perform a forensic analysis of a historical performance of apparatus 124/224, in other use cases, operational data 126/226 may be received dynamically while apparatus 124/224 is in operation. Thus query 128/228 may identify a timestamp corresponding to a previous operating state of apparatus 124/224, or a timestamp corresponding to a present operating state of apparatus 124/224.

In some implementations, as shown in FIG. 1, query 128 may be received from system user 128 via portable device 140, communication network 120 and network communication links 122, in action 462, by software code 110, executed by hardware processor 104 of system 100. In other implementations, as shown by FIG. 2, query 228 may be received as an input to portable device 240, in action 462, by software code 210, executed by hardware processor 244 of portable device 240.

Continuing to refer to FIG. 4A in combination with FIGS. 1 and 2, flowchart 460 further includes obtaining, based on operational data 126/226 and in response to query 128/228, software design model 132/232 of apparatus 124/224 (action 463). It is noted that software design model 132/232 of apparatus 124/224 may include thousands of pages of documentation and may describe multiple nested internal operating states of apparatus 124/224.

In some implementations, as shown in FIG. 1, software design model 132 may be obtained from software design model database 130 via communication network 120 and network communication links 122, in action 463, by software code 110, executed by hardware processor 104 of system 100. In other implementations, as shown by FIG. 2, software design model 232 may be obtained from software design model database 230 via communication network 220 and network communication links 222, in action 463, by software code 210, executed by hardware processor 244 of portable device 240.

Continuing to refer to FIG. 4A in combination with FIGS. 1 and 2, flowchart 460 further includes identifying, using operational data 126/226 and software design model 132/

232 of apparatus 124/224, the operational status of apparatus 124/224 at the apparatus event and/or the timestamp identified by query 128/228 (action 464). In some implementations, action 464 may be performed by software code 110, executed by hardware processor 104 of system 100. However, in other implementations action 464 may be performed by software code 210, executed by hardware processor 244 of portable device 240.

Referring to FIG. 4A in combination with FIGS. 1, 2 and 3, flowchart 460 further includes, generating, based on software design model 132/232 of apparatus 124/224, visual representation 352 of operational status 354b of apparatus 124/224 at the apparatus event and/or the timestamp identified by query 128/228 (action 465). As noted above, although in some use cases operational data 126/226, received in action 461, may describe a past operation of apparatus 124/224, in other use cases, operational data 126/226 may be received dynamically while apparatus 124/224 is in operation. Thus visual representation 352 may depict a previous operational status of apparatus 124/224 or a present operational status of apparatus 124/224. Action 465 may be performed by software code 110, executed by hardware processor 104 of system 100. Alternatively, in some implementations, action 465 may be performed by software code 210, executed by hardware processor 244 of portable device 240.

Continuing to refer to FIG. 4A in combination with FIGS. 1, 2 and 3, flowchart 460 further includes, providing output data 142/242 including visual representation 352 to system user 138 (action 466). In some implementations, as shown in FIG. 1, providing output data 142 to system user 138, in action 466, may include transmitting, by system 100, output data 142 to portable device 140 via communication network 120 and network communication links 122. In those implementations, action 466 may be performed by software code 110, executed by hardware processor 104 of system 100.

However, in other implementations, as shown in FIGS. 2 and 3, providing output data 242 including visual representation 352 to system user 138, in action 466, may include rendering visual representation 352 on display 250/350 of portable device 240/340. In implementations in which action 466 includes rendering visual representation 352 on display 250/350, action 466 may be performed by software code 210, executed by hardware processor 244 of portable device 240/340.

Moreover, whether action 466 is performed by system 100 or portable device 140/240/340, in some implementations, output data 142/242 including visual representation 352 may be provided to system user 138 in real-time with respect to receiving operational data 126/226 in action 461. It is noted that, as defined for the purposes of the present application, the expression "real-time" refers to latency of one second or less. Thus, in some implementations, output data 142/242 including visual representation 352 may be provided to system user 138, in action 466, within receipt of operational data 126/226 by system 100 or portable device 140/240/340 in action 461.

As stated above, FIG. 4B shows additional actions for extending the method outlined in FIG. 4A, according to one implementation. Referring to FIG. 4B in combination with FIGS. 1 and 2, in some implementations, flowchart 460 may further include accessing, further in response to query 128/228, control software code 136/236 of apparatus 124/224 (action 467). As shown in FIG. 1, when action 467 is included in the method outlined by flowchart 460, control software code 136 may be accessed from control software code database 134 by software code 110, executed by hardware processor 104 of system 100, and using communication network 120 and network communication links 122. Alternatively, and as shown in FIG. 2, in some implementations, when action 467 is included in the method outlined by flowchart 460, control software code 236 may be accessed from control software code database 234 by software code 210, executed by hardware processor 244 of portable device 240, and using communication network 220 and network communication links 222.

Continuing to refer to FIGS. 1, 2 and 4B in common, in implementations in which action 467 is performed, flowchart 460 further includes mapping the operational status of apparatus 124/224 at the apparatus event and/or the timestamp identified by query 128/228 to one or more lines of control software code 136/236 of apparatus 124/224 (action 468). It is noted that in implementations in which actions 467 and 468 are performed, those actions would typically precede action 466, in FIG. 4A. Moreover, in those implementations, output data 142/242 provided in action 466 may further include the one or more lines of control software code 136/236 to which the apparatus event and/or the timestamp identified by query 128/228 is mapped in action 468. Action 468 may be performed by software code 110, executed by hardware processor 104 of system 100. Alternatively, in some implementations, action 468 may be performed by software code 210, executed by hardware processor 244 of portable device 240.

With respect to the method outlined by FIGS. 4A and 4B, it is emphasized that actions 461, 462, 463, 464 and 465 (hereinafter "actions 461-465"), as well as action 466, or actions 461-465, 467, 468 and 466 may be performed in an automated process from which human involvement may be omitted.

Thus, the present application discloses systems and methods for providing design model-based visual representation of apparatus operational status that address and overcome the drawbacks and deficiencies in the conventional art by enabling system developers and engineers to easily navigate complex apparatus-based software design models. The solution disclosed in the present application advances the state-of-the-art by serving as a translator between operational data generated by an apparatus, and the operational status of the apparatus at the time the operational data is generated, and thus advantageously provides an automatic way for engineers to visualize relevant portions of the software design model of the apparatus. The present diagnostic solution leads to increased accuracy during analysis of apparatus performance and reduced time and effort when troubleshooting because the solution aligns the operational data with the software design model. Moreover, in some implementations, the present diagnostic solution enables an engineer or other troubleshooter to map the operational status of the apparatus when operational data is generated, to specific lines of the control software code for the apparatus.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:

a hardware processor; and a memory storing a software code;

the hardware processor configured to execute the software code to:

receive operational data including a plurality of timestamps each corresponding to an operating state of an apparatus;

receive, from a system user, a query identifying at least one of an apparatus event or one of the plurality of timestamps;

obtain, based on the operational data and in response to the query, a software design model of the apparatus;

identify, using the operational data and the software design model, an operational status of the apparatus at the at least one of the apparatus event or the one of the plurality of timestamps;

generate, based on the software design model, a visual representation of the operational status of the apparatus at the at least one of the apparatus event or the one of the plurality of timestamps; and provide an output data including the visual representation to the system user.

2. The system of claim 1, wherein the operational data is received dynamically while the apparatus is in operation.

3. The system of claim 1, wherein the output data including the visual representation is provided to the system user in real-time with respect to receiving the operational data.

4. The system of claim 1, wherein the operational data describes a past operation of the apparatus.

5. The system of claim 1, wherein the hardware processor is further configured to execute the software code to:

access, further in response to the query, a control software code of the apparatus;

map the operational status of the apparatus at the at least one of the apparatus event or the one of the plurality of timestamps to one or more lines of the control software code;

wherein the output data further includes the one or more lines of the control software code.

6. The system of claim 1, further comprising a display, the hardware processor further configured to execute the software code to:

render the visual representation on the display.

7. The system of claim 6, wherein the system is embodied in a portable device.

8. A method for use by a system including a hardware processor and a memory storing a software code, the method comprising:

receiving, by the software code executed by the hardware processor, operational data including a plurality of timestamps each corresponding to an operating state of an apparatus;

receiving, from a system user, by the software code executed by the hardware processor, a query identifying at least one of an apparatus event or one of the plurality of timestamps;

obtaining, by the software code executed by the hardware processor based on the operational data and in response to the query, a software design model of the apparatus;

identifying, by the software code executed by the hardware processor and using the operational data and the software design model, an operational status of the apparatus at the at least one of the apparatus event or the one of the plurality of timestamps;

generating, by the software code executed by the hardware processor based on the software design model, a visual representation of the operational status of the apparatus at the at least one of the apparatus event or the one of the plurality of timestamps; and providing, by the software code executed by the hardware processor, an output data including the visual representation to the system user.

9. The method of claim 8, wherein the operational data is received dynamically while the apparatus is in operation.

10. The method of claim 8, wherein the output data including the visual representation is provided to the system user in real-time with respect to receiving the operational data.

11. The method of claim 8, wherein the operational data describes a past operation of the apparatus.

12. The method of claim 8, further comprising:

accessing, further in response to the query, by the software code executed by the hardware processor, a control software code of the apparatus;

mapping, by the software code executed by the hardware processor, the operational status of the apparatus at the at least one of the apparatus event or the one of the plurality of timestamps to one or more lines of the control software code;

wherein the output data further includes the one or more lines of the control software code.

13. The method of claim 8, wherein the system further comprises a display, the method further comprising:

rendering, by the software code executed by the hardware processor, the visual representation on the display.

14. The method of claim 13, wherein the system is embodied in a portable device.

15. A computer-readable non-transitory medium having stored thereon instructions, which when executed by a hardware processor, instantiate a method comprising:

receiving operational data including a plurality of timestamps each corresponding to an operating state of an apparatus;

receiving, from a system user, a query identifying at least one of an apparatus event or one of the plurality of timestamps;

obtaining, based on the operational data and in response to the query, a software design model of the apparatus;

identifying, using the operational data and the software design model, an operational status of the apparatus at the at least one of the apparatus event or the one of the plurality of timestamps;

generating, based on the software design model, a visual representation of the operational status of the apparatus at the at least one of the apparatus event or the one of the plurality of timestamps; and providing an output data including the visual representation to the system user.

16. The computer-readable non-transitory medium of claim 15, wherein the operational data is received dynamically while the apparatus is in operation.

17. The computer-readable non-transitory medium of claim 15, wherein the output data including the visual representation is provided to the system user in real-time with respect to receiving the operational data.

18. The computer-readable non-transitory medium of claim 15, wherein the operational data describes a past operation of the apparatus.

19. The computer-readable non-transitory medium of claim 15, the method further comprising:

accessing, further in response to the query, a control software code of the apparatus;

mapping the operational status of the apparatus at the at least one of the apparatus event or the one of the plurality of timestamps to one or more lines of the control software code;

wherein the output data further includes the one or more lines of the control software code.

20. The computer-readable non-transitory medium of claim 15, the method further comprising:

rendering the visual representation on a display.

* * * * *